(12) United States Patent
Hirano

(10) Patent No.: US 8,817,938 B2
(45) Date of Patent: Aug. 26, 2014

(54) INSPECTION HOLE PLUG

(75) Inventor: Hiroshi Hirano, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 530 days.

(21) Appl. No.: 13/183,813

(22) Filed: Jul. 15, 2011

(65) Prior Publication Data

US 2012/0014492 A1 Jan. 19, 2012

(30) Foreign Application Priority Data

Jul. 16, 2010 (JP) ................................. 2010-161773

(51) Int. Cl.
- G21C 13/00 (2006.01)
- F22B 1/02 (2006.01)
- F22B 37/00 (2006.01)
- F22B 37/22 (2006.01)
- F16L 55/11 (2006.01)

(52) U.S. Cl.
CPC ............... *F22B 1/023* (2013.01); *F22B 37/002* (2013.01); *F22B 37/223* (2013.01); *F16L 55/1125* (2013.01)
USPC .......................................................... 376/203

(58) Field of Classification Search
USPC ................................................. 376/203–206
See application file for complete search history.

(56) References Cited

U.S. PATENT DOCUMENTS

| | | | |
|---|---|---|---|
| 1,346,496 A | 7/1920 | Housley | |
| 4,693,389 A * | 9/1987 | Kalen | 220/236 |
| 5,251,241 A * | 10/1993 | Moore et al. | 376/204 |
| 2009/0218772 A1 | 9/2009 | Asplund et al. | |

FOREIGN PATENT DOCUMENTS

| | | |
|---|---|---|
| EP | 0119289 A1 | 9/1984 |
| GB | 2110787 A | 6/1983 |
| JP | 06-222189 A | 8/1994 |

OTHER PUBLICATIONS

European Office Action dated Nov. 22, 2011, issued in corresponding European Patent Application No. 11173868.8.

* cited by examiner

*Primary Examiner* — Timothy A Brainard
(74) *Attorney, Agent, or Firm* — Westerman, Hattori, Daniels & Adrian, LLP

(57) ABSTRACT

[Problem to be Solved] To easily perform assembly at the time of plugging an inspection hole.

[Solution] An inspection hole plug 1 that plugs an inspection hole of an outer casing 136 surrounding a tube bundle in a steam generator includes: a base 2 fixed to the outer casing 136 and having an opening 21 that serves as the inspection hole; a fitting member 3 that plugs the opening 21 of the base 2; a fitting unit 4 that guides rotational movement of the fitting member 3 in a circumferential direction along an inner peripheral edge of the opening 21 of the base 2 and restricts the rotational movement by an axial movement of the fitting member 3 parallel to a central axis R of the rotational movement to fit the inner peripheral edge of the opening 21 of the base 2 and an outer peripheral edge of the fitting member 3 to each other; a holding member 5 into which a shaft portion 31 extending from the fitting member 3 along the axial direction is inserted and that is provided to be capable of abutting on the base 2; and a fastening member 6 that is screwed onto the shaft portion 31 of the fitting member 3 and holds the fitting member 3 at a position axially moved by fastening thereof with the holding member 5 abutting on the base 2.

4 Claims, 5 Drawing Sheets

INSPECTION HOLE PLUG

TECHNICAL FIELD

The present invention relates to an inspection hole plug that plugs an inspection hole formed on an outer casing that surrounds a tube bundle including heat-transfer tubes in a steam generator.

BACKGROUND ART

A steam generator provided in a nuclear plant has an inspection hole formed on an outer casing that surrounds the tube bundle including heat-transfer tubes to perform internal checkup or inspection during plant suspension. The inspection hole is plugged by the inspection hole plug during plant operation, so that a secondary coolant does not circulate inside or outside the outer casing through the inspection hole.

Conventionally, an inspection hole plug (a wrapper closure assembly) described in Patent Literature 1 includes a plate fitted to an outer casing of a tube bundle, a plug having a first end for plugging a bore penetrating the plate, a sleeve into which a second end of the plug is inserted, and a nut attached to the second end of the plug. The plate includes a connection on an inner circumference of the bore. At least one aperture is formed at the connection. The plug includes a flange fitted to the connection at the first end. The flange includes an aperture aligned with the aperture in the connection when the bore is plugged by the first end of the plug. The sleeve includes a pin installed through the aligned apertures of the plate and the plug. When the nut is attached to the second end of the plug, the pin of the sleeve is prevented from slipping out of each aperture, thereby fixing the plug to the plate.

CITATION LIST

Patent Literature

[PTL 1] JPA H06-222189A

SUMMARY OF INVENTION

Technical Problem

In the inspection hole plug described in Patent Literature 1, the plug is held with respect to the plate by inserting the pin provided in the sleeve through the aligned apertures. However, because the pin is provided at an end of the sleeve for inserting it into the plug, visual check is difficult at the time of inserting the pin into the aligned apertures, resulting in low workability. Further, the connection of the plate and the flange of the plug engage with each other to be perfectly fitted to each other, and accordingly workability in turning the plug at the time of aligning the respective holes is also low. Therefore, assembly of the inspection hole plug cannot be performed easily.

The present invention has been achieved to solve the above problems. It is an object of the present invention to provide an inspection hole plug that can facilitate assembly at the time of plugging the inspection hole plug.

Solution to Problem

According to an aspect of the present invention, an inspection hole plug that plugs an inspection hole of an outer casing surrounding a tube bundle in a steam generator, includes: a base fixed to the outer casing and having an opening that serves as the inspection hole; a fitting member that plugs the opening of the base; a fitting unit that guides rotational movement of the fitting member in a circumferential direction along an inner peripheral edge of the opening of the base, and restricts the rotational movement by an axial movement of the fitting member parallel to a shaft center of the rotational movement to fit the inner peripheral edge of the opening of the base and an outer peripheral edge of the fitting member to each other; a holding member into which a shaft portion extending from the fitting member along the axial direction is inserted and that is provided to be capable of abutting on the base; and a fastening member that is screwed onto the shaft portion of the fitting member and holds the fitting member at a position axially moved by fastening thereof with the holding member abutting on the base.

According to the inspection hole plug, because the fitting member is rotationally moved with respect to the base, the shaft portion of the fitting member is inserted into the holding member, and the fastening member is screwed onto the shaft portion and fastened, the fitting member is axially moved to fit to the fitting unit. Therefore, in fitting the fitting member to the base, neither perfect fitting as in the conventional art is required in the rotational movement nor insertion of the pin into the apertures as in the conventional art is required to restrict the rotation. As a result, assembly at the time of plugging the inspection hole can be performed easily.

Advantageously, in the inspection hole plug, the base includes a depressed portion into which an abutting end of the holding member is inserted.

The holding member holds an axial movement of the fitting member caused by fastening of the fastening member. According to the inspection hole plug, by inserting the abutting end of the holding member into the depressed portion of the base, the axial movement of the fitting member can be reliably held. As a result, the assembly at the time of plugging the inspection hole can be performed easily and reliably.

Advantageously, in the inspection hole plug, the fastening member includes a stepped portion that is fitted to the holding member.

The fastening member axially moves the fitting member between the fastening member and the holding member abutting on the base by fastening thereof. According to the inspection hole plug, the stepped portion of the fastening member is fitted to the holding member, thereby enabling to reliably hold the axial movement of the fitting member. As a result, the assembly at the time of plugging the inspection hole can be performed easily and reliably.

Advantageously, in the inspection hole plug, in the steam generator, a bore through which the inspection hole can be seen from outside of a body that covers around the outer casing is formed in the body, and the holding member includes a restricting member arranged in the bore in a state with the holding member abutting on the base to restrict passage of the fastening member toward the outer casing between an inner periphery of the bore and the holding member.

According to the inspection hole plug, the fastening member is detached to open the inspection hole. In this case, the restricting member restricts a state where the fastening member goes toward the outer casing, thereby preventing the fastening member from falling between the outer casing and the body.

Advantageously, in the inspection hole plug, the holding member includes a positioning portion for positioning the restricting member at a position in the bore in the state with the holding member abutting on the base.

According to the inspection hole plug, because the restricting member is positioned at the position in the bore in the state with the holding member abutting on the plate, it is possible to reliably prevent the fastening member from falling between the outer casing and the body.

Advantageous Effects of Invention

According to the present invention, the assembly at the time of plugging the inspection hole can be performed easily.

DESCRIPTION OF EMBODIMENTS

Exemplary embodiments according to the present invention will be explained below in detail with reference to the accompanying drawings. The present invention is not limited to the embodiments. Constituent elements in the following embodiments include those can be easily replaced by persons skilled in the art or substantially the same.

Figure 1:
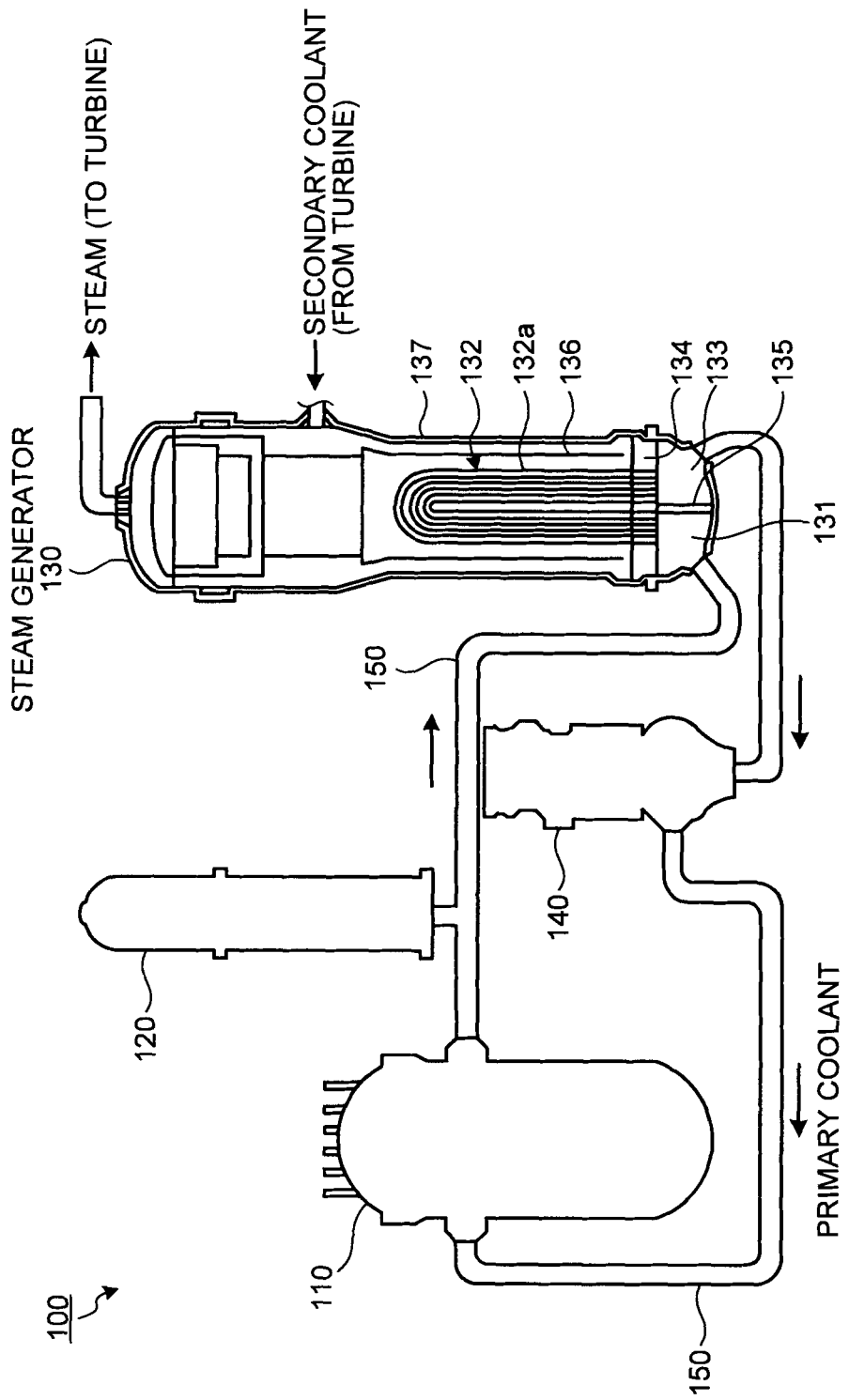
FIG. 1 is a configuration diagram of a general nuclear plant.
Figure 2:
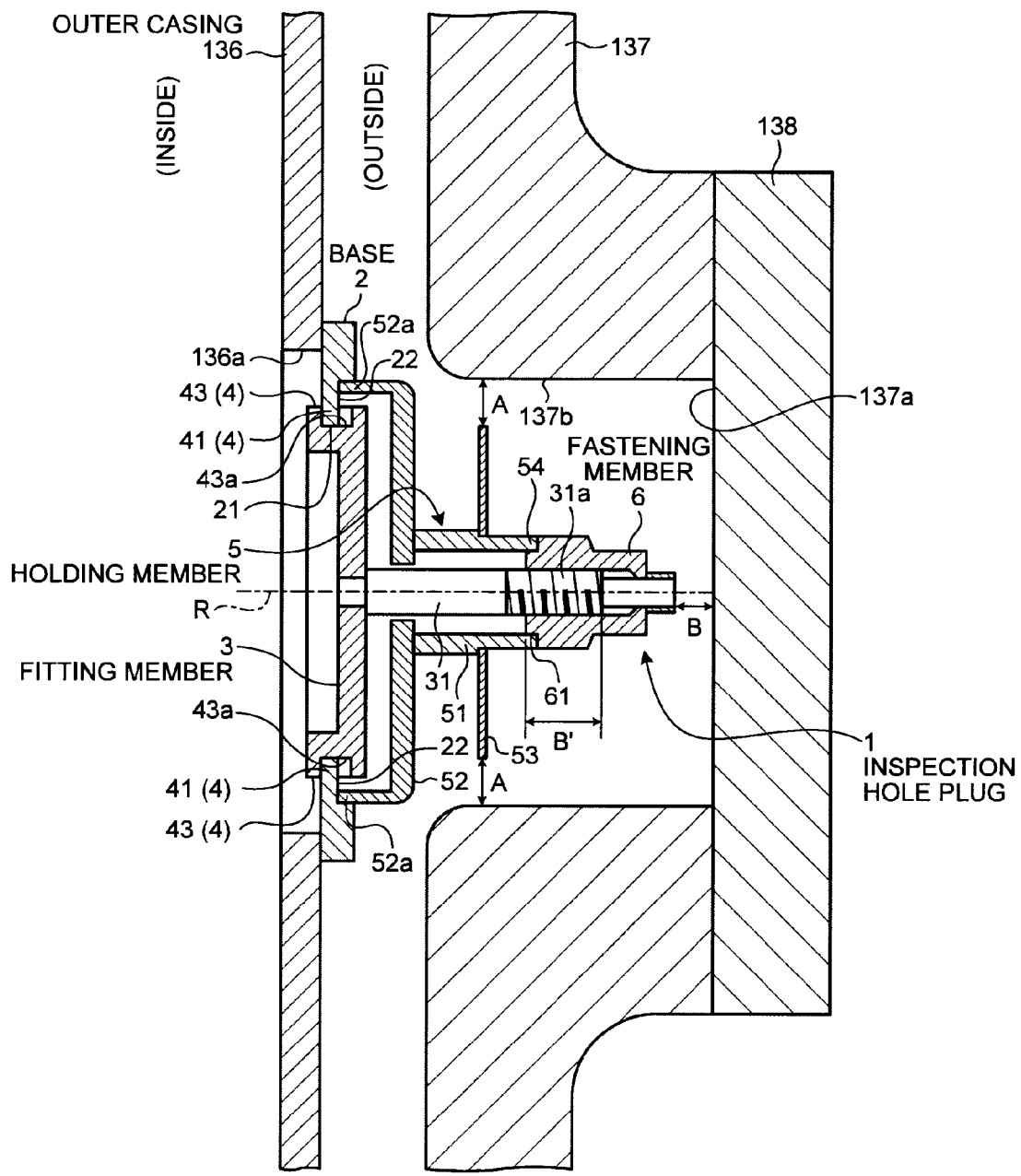
FIG. 2 is a cross-sectional view of an inspection hole plug according to an embodiment of the present invention.
Figure 3:
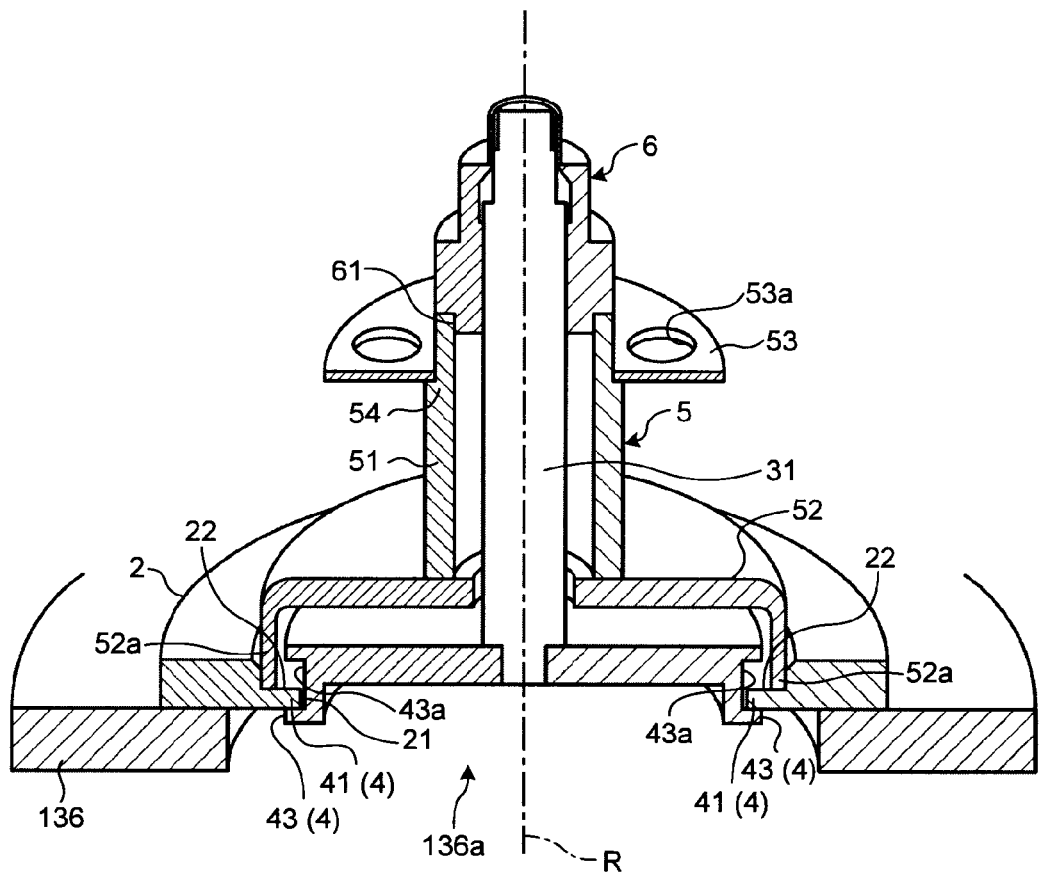
FIG. 3 is a perspective view of the inspection hole plug shown in FIG. 2.
Figure 4:
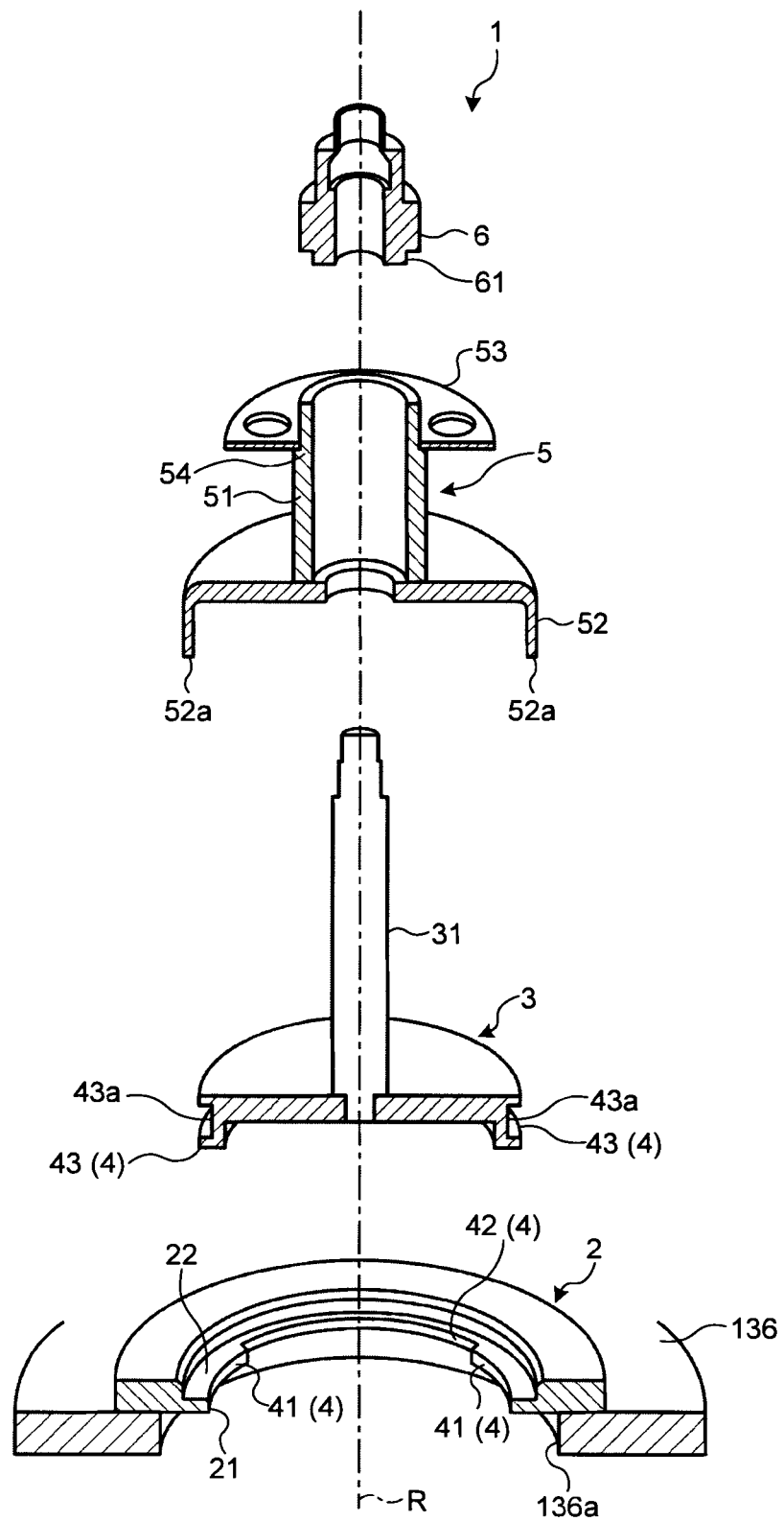
FIG. 4 is an exploded perspective view of the inspection hole plug shown in FIG. 2.

An embodiment of the present invention is explained with reference to the drawings. FIG. 1 depicts a general nuclear plant. As a nuclear plant 100, there is a pressurized water reactor (PWR), for example. In the nuclear plant 100, a reactor vessel 110, a pressurizer 120, a steam generator 130, and a pump 140 are sequentially connected to each other by a primary coolant pipe 150 to form a circulation route of a primary coolant. A circulation route of a secondary coolant is formed between the steam generator 130 and a turbine (not shown).

In the nuclear plant 100, the primary coolant is heated in the reactor vessel 110 to have a high temperature and a high pressure, then pressurized by the pressurizer 120 to maintain the pressure constant, and supplied to the steam generator 130 via the primary coolant pipe 150. In the steam generator 130, the primary coolant flows into an inlet-side water chamber 131 and is supplied to a plurality of U-shaped heat-transfer tubes 132a from the inlet-side water chamber 131. Heat exchange is performed between the primary and secondary coolants in the heat-transfer tubes 132a, and then the secondary coolant evaporates to become steam. The secondary coolant, which has become steam by heat exchange, is supplied to the turbine. The turbine is driven by evaporation of the secondary coolant. Power of the turbine is transmitted to a power generator (not shown) to generate electric power. The steam having been used for driving the turbine is condensed to become water, which is supplied to the steam generator 130. On the other hand, the primary coolant after the heat exchange reaches an outlet-side water chamber 133 through the heat-transfer tubes 132a and is recovered by the pump 140 via the primary coolant pipe 150.

Inside of the steam generator 130 is divided by a tube bundle 132 including a tube plate 134 and the heat-transfer tubes 132a into a primary side in which the primary coolant flows and a secondary side in which the secondary coolant flows. The tube plate 134 supports lower ends of the heat-transfer tubes 132a arranged on the secondary side. The water chambers 131 and 133 on the primary side are separated by a partition plate 135. The heat-transfer tubes 132a supported by the tube plate 134 form the tube bundle 132 and are surrounded by a cylindrical outer casing 136. A clearance is provided between a lower end of the outer casing 136 and the tube plate 134. A body 137 constituting an outer envelope of the steam generator 130 is provided to cover around the outer casing 136. The secondary coolant flowing into the steam generator 130 moves down between the body 137 and the outer casing 136, passes through the clearance at the lower end of the outer casing 136, moves up in the outer casing 136, and performs heat exchange with the primary coolant passing through the heat-transfer tubes 132a during moving-up.

In the steam generator 130 configured in this manner, an inspection hole is provided for internal checkup or inspection of the nuclear plant 100 during stop time of the nuclear plant 100. During operation of the plant, the inspection hole is plugged by an inspection hole plug 1 according to the present embodiment so that the secondary coolant does not circulate inside or outside the outer casing 136 via the inspection hole. A bore 137a through which the inspection hole can be seen from outside of the body 137 (outside of the steam generator 130) is formed in the body 137 of the steam generator 130. The bore 137a is plugged by a lid 138 so that the secondary coolant does not leak therefrom during operation of the plant.

FIGS. 2 to 5 depict the inspection hole plug according to the present embodiment. The inspection hole plug 1 includes a base 2, a fitting member 3, a fitting unit 4, a holding member 5, and a fastening member 6.

The base 2 is formed in an annular shape having a circular opening 21. The base 2 is fixed to the outer casing 136, and the opening 21 communicates with an opening 136a provided in the outer casing 136, thereby forming the inspection hole communicating with the inside and outside of the outer casing 136.

The fitting member 3 is formed in a disk shape and fitted to the opening 21 of the base 2 with the fitting unit 4. The fitting member 3 is provided to rotationally move in a circumferential direction along an inner peripheral edge of the opening 21 of the base 2 with the fitting unit 4. The fitting member 3 includes a rod-like shaft portion 31 extending outward of the outer casing 136 along a shaft center R of the rotation.

Figure 5:
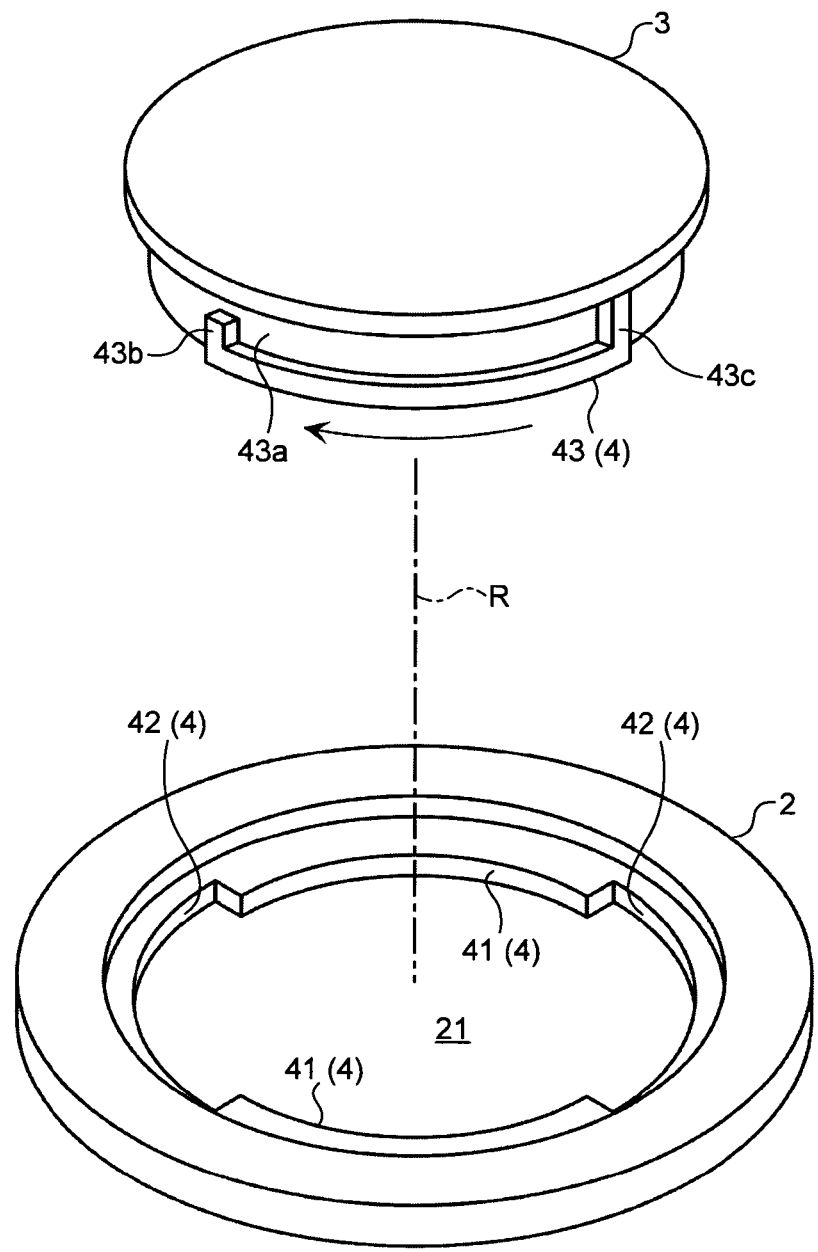
FIG. 5 is an exploded perspective view of a fitting unit of the inspection hole plug shown in FIG. 2.

The fitting unit 4 is provided on the side of the base 2 and on the side of the fitting member 3. As shown in FIG. 5, the fitting unit 4 on the side of the base 2 includes fitting pieces 41 extending inward, and notches 42 provided between the fitting pieces 41 on an inner peripheral edge of the opening 21. The fitting pieces 41 are provided with equal intervals in the circumferential direction of the inner peripheral edge of the opening 21. The notches 42 are provided between the fitting pieces 41 in the circumferential direction of the inner peripheral edge of the opening 21 in the same number as that of the fitting pieces 41. For example, as shown in FIG. 5, when two fitting pieces 41 are provided, the fitting pieces 41 are arranged to face each other on the inner peripheral edge of the opening 21, and the notches 42 are arranged between the fitting pieces 41 to face each other on the inner peripheral edge of the opening 21.

On the other hand, as shown in FIG. 5, the fitting unit 4 on the side of the fitting member 3 includes fitting protrusions 43 on an outer peripheral edge thereof. The fitting protrusions 43 are provided with equal intervals in the circumferential direction of the outer peripheral edge of the fitting member 3 and in the same number as that of the fitting pieces 41 (and the notches 42). The fitting protrusions 43 have a length in the circumferential direction of the outer peripheral edge of the fitting member 3 formed to be inserted into the notches 42 between the fitting pieces 41. The fitting protrusions 43 further include a guide groove 43a for guiding the rotational movement by inserting the fitting piece 41 therein during the rotation of the fitting member 3 around the shaft center R. In the fitting protrusions 43, an axial size of the guide groove 43a is formed larger than the fitting piece 41 so that the fitting member 3 can be moved in an axial direction parallel to the shaft center R in a state with the fitting piece 41 inserted into the guide groove 43a. A restriction flange 43b that is latched with a circumferential end of the fitting piece 41 by the axial movement of the fitting member 3 to restrict rotational movement of the fitting member 3 is formed in the fitting protrusions 43. The fitting protrusions 43 further have a restriction wall 43c formed on a side opposite to the restriction flange 43b in the guide groove 43a. The fitting piece 41 abuts on the restriction wall 43c in the rotational movement of the fitting member 3 to render the fitting member 3 incapable of rotating so that a positional relation between the fitting piece 41 and the fitting protrusion 43 becomes a rotation position of the fitting member 3 at which the fitting piece 41 can be latched with the restriction flange 43b.

In this manner, the fitting unit 4 guides the rotational movement of the fitting member 3 in the circumferential direction along the inner peripheral edge of the opening 21 of the base 2 by inserting the fitting pieces 41 into the guide grooves 43a of the fitting protrusions 43, and restricts the rotational movement by latching the restriction flanges 43b of the fitting protrusions 43 with the fitting pieces 41 by the axial movement of the fitting member 3 parallel to the shaft center R of the rotational movement, thereby fitting the inner peripheral edge of the opening 21 of the base 2 and the outer peripheral edge of the fitting member 3 to each other. This position of the fitting member 3 at which the fitting member 3 is fitted to the fitting unit 4 after having rotated and axially moved is referred to as a fitting position.

The holding member 5 includes a cylindrical insertion portion 51 into which the shaft portion 31 of the fitting member 3 is inserted, and a leg portion 52 fixed to the insertion portion 51 and provided in such a manner that the leg portion 52 can abut on the base 2 across the fitting member 3 in a state with the shaft portion 31 inserted into the insertion portion 51. The leg portion 52 has a cup shape to cover the fitting member 3 within the outer casing 136, and an opened end thereof becomes an abutting end 52a that abuts on the base 2. On the base 2, a depressed portion 22 into which the abutting end 52a of the leg portion 52 is inserted is formed at a position where the abutting end 52a abuts.

The holding member 5 also includes a restricting member 53. The restricting member 53 is formed in a circular disk fixed around the insertion portion 51 and extending outward of the insertion portion 51. The restricting member 53 has a gap of a size A from an inner periphery 137b of the bore 137a provided in the body 137 of the steam generator 130 in a state with the leg portion 52 abutting on the base 2. The gap of the size A prevents passage of the fastening member 6. A plurality of holes 53a having such a size that the fastening member 6 cannot pass therethrough are formed in the restricting member 53 to allow circulation of the secondary coolant and reduce the weight.

The holding member 5 also includes a positioning portion 54 for positioning the restricting member 53. The positioning portion 54 is a stepped portion formed on an outer circumference of the insertion position 51, and locates the restricting member 53 at a position in the bore 137a in a state with the holding member 5 abutting on the base 2 by fitting the restricting member 53 to the stepped portion.

The fastening member 6 is formed as a nut to be screwed onto a male screw 31a at the tip of the shaft portion 31 of the fitting member 3. The fastening member 6 is screwed onto the shaft portion 31 protruding from the insertion portion 51 of the holding member 5. The fastening member 6 abuts on the insertion portion 51 of the holding member 5 to cause the holding member 5 to abut on the base 2 and causes the fitting member 3 to axially move by further fastening, thereby holding the position. In this manner, the fastening member 6 is screwed onto the shaft portion 31 of the fitting member 3 to hold the fitting member 3 with the holding member 5 abutting on the base 2 at the fitting position moved in the axial direction.

The fastening member 6 also includes a stepped portion 61 fitted to the end of the insertion portion 51 of the holding member 5. The stepped portion 61 is fitted to the insertion portion 51, thereby positioning the shaft portion 31 on the shaft center R.

The inspection hole plug 1 according to the present embodiment thus configured includes the base 2 having the opening 21, which is fixed to the outer casing 136 and serves as the inspection hole, the fitting member 3 that plugs the opening 21 of the base 2, the fitting unit 4 that guides the rotational movement of the fitting member 3 in the circumferential direction along the inner peripheral edge of the opening 21 of the base 2 and restricts the rotational movement by movement of the fitting member 3 in the axial direction parallel to the shaft center R of the rotational movement to fit the inner peripheral edge of the opening 21 of the base 2 and the outer peripheral edge of the fitting member 3 to each other, the holding member 5 into which the shaft portion 31 extending from the fitting member 3 along the axial direction is inserted and that is provided so that it can abut on the base 2, and the fastening member 6 screwed onto the shaft portion 31 of the fitting member 3 to hold the fitting member 3 by fastening thereof with the holding member 5 abutting on the base 2 at the position where the fitting member 3 is axially moved.

According to the inspection hole plug 1, the fitting member 3 is rotationally moved with respect to the base 2, the shaft portion 31 of the fitting member 3 is inserted into the holding member 5, and the fastening member 6 is screwed onto the shaft portion 31 and fastened, whereby the fitting member 3 is axially moved and the fitting unit 4 is fitted thereto. Therefore, to fit the fitting member 3 to the base 2, neither perfect fitting as in the conventional art is required in the rotational movement nor insertion of the pin into the aperture as in the conventional art is required to restrict the rotation. As a result, assembly at the time of plugging the inspection hole can be performed easily.

In the inspection hole plug 1 according to the present embodiment, the base 2 includes the depressed portion 22 into which the abutting end 52a of the holding member 5 is inserted.

The holding member 5 holds the axial movement of the fitting member 3 caused by fastening of the fastening member 6. According to the inspection hole plug 1, by inserting the abutting end 52a of the holding member 5 into the depressed portion 22 of the base 2, axial movement of the fitting member 3 can be reliably held. As a result, the assembly at the time of plugging the inspection hole can be performed easily and reliably.

In the inspection hole plug 1 according to the present embodiment, the fastening member 6 includes the stepped portion 61 fitted to the holding member 5.

The fastening member 6 axially moves the fitting member 3 by fastening thereof between the fastening member 6 and the holding member 5 abutting on the base 2. According to the inspection hole plug 1, the axial movement of the fitting member 3 can be reliably held by fitting the stepped portion 61 of the fastening member 6 to the holding member 5. As a result, the assembly at the time of plugging the inspection hole can be performed easily and reliably.

According to the inspection hole plug 1 of the present embodiment, in the steam generator 130, the bore 137a through which the inspection hole can be seen from outside of the body 137 that covers around the outer casing 136 is formed in the body 137. The holding member 5 has the restricting member 53, which is placed in the bore 137a in the state with the holding member 5 abutting on the base 2 to restrict the passage of the fastening member 6 toward the outer casing 136 between the inner periphery 137b of the bore 137a and the holding member 5.

According to the inspection hole plug 1, the fastening member 6 is detached to open the inspection hole. In this case, the restricting member 53 restricts a state where the fastening member 6 goes toward the outer casing 136, thereby preventing the fastening member 6 from falling between the outer casing 136 and the body 137.

In the inspection hole plug 1 according to the present embodiment, the holding member 5 includes the positioning portion 54 for positioning the restricting member 53 at a position in the bore 137a in the state with the holding member 5 abutting on the base 2.

According to the inspection hole plug 1, because the restricting member 53 is positioned at the position in the bore 137a in the state with the holding member 5 abutting on the base 2, it is possible to reliably prevent the fastening member 6 from falling between the outer casing 136 and the body 137.

According to the inspection hole plug 1 of the present embodiment, the steam generator 130 has the bore 137a through which the inspection hole can be seen from outside of the body 137 that covers around the outer casing 136 formed in the body 137, and the lid 138 that closes the bore 137a. Furthermore, it is preferable that a movement size B' of the fastening member 6 separated from the shaft portion 31 of the fitting member 3 be formed longer than a size B between the lid 138 and the fastening member 6.

According to inspection hole plug 1, even if fastening of the fastening member 6 becomes loose, it is possible to prevent the fastening member 6 screwed onto the shaft portion 31 from slipping.

INDUSTRIAL APPLICABILITY

As described above, the inspection hole plug according to the present invention is suitable for easy assembly at the time of plugging the inspection hole plug.

REFERENCE SIGNS LIST 1 inspection hole plug
2 base
21 opening
22 depressed portion
3 fitting member
31 shaft portion
31a male screw
4 fitting unit
41 fitting piece
42 notch
43 fitting protrusion
43a guide groove
43b restriction flange
43c restriction wall
5 holding member
51 insertion portion
52 leg portion
52a abutting end
53 restricting member
53a hole
54 positioning portion
6 fastening member
61 stepped portion
130 steam generator
132 tube bundle
132a heat-transfer tube
136 outer casing
136a opening
137 body
137a bore
137b inner periphery
138 lid
R shaft center

The invention claimed is:

1. An inspection hole plug that plugs an inspection hole of an outer casing surrounding a tube bundle in a steam generator, the inspection hole plug comprising:
a base fixed to the outer casing and having an opening that serves as the inspection hole;
a fitting member that plugs the opening of the base;
a fitting unit that guides rotational movement of the fitting member in a circumferential direction along an inner peripheral edge of the opening of the base, and restricts the rotational movement by an axial movement of the fitting member parallel to a shaft center of the rotational movement to fit the inner peripheral edge of the opening of the base and an outer peripheral edge of the fitting member to each other;
a holding member into which a shaft portion extending from the fitting member along the axial direction is inserted and that is provided to be capable of abutting on the base; and
a fastening member that is screwed onto the shaft portion of the fitting member and holds the fitting member at a position axially moved by fastening thereof with the holding member abutting on the base,
wherein in the steam generator, a bore through which the inspection hole can be seen from outside of a body that covers around the outer casing is formed in the body, and the holding member includes a restricting member arranged in the bore in a state with the holding member abutting on the base to restrict passage of the fastening member toward the outer casing between an inner periphery of the bore and the holding member.

2. The inspection hole plug of claim 1, wherein the base includes a depressed portion into which an abutting end of the holding member is inserted.

3. The inspection hole plug of claim 1, wherein the fastening member includes a stepped portion that is fitted to the holding member.

4. The inspection hole plug of claim 1, wherein the holding member includes a positioning portion for positioning the restricting member at a position in the bore in the state with the holding member abutting on the base.

* * * * *